US012703596B2

(12) United States Patent
Zhang et al.

(10) Patent No.: US 12,703,596 B2
(45) Date of Patent: Aug. 11, 2026

(54) WINDING NEEDLE ASSEMBLY, WINDING APPARATUS, PRODUCTION DEVICE, AND METHOD FOR WINDING ELECTRODE ASSEMBLIES

(71) Applicant: CONTEMPORARY AMPEREX TECHNOLOGY CO., LIMITED, Ningde (CN)

(72) Inventors: Xiaowei Zhang, Ningde (CN); Chao Xie, Ningde (CN); Guoda Huang, Ningde (CN); Xiang Wu, Ningde (CN); Yuqian Wen, Ningde (CN); Minghao Tang, Ningde (CN); Shengwu Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/319,682

(22) Filed: Sep. 4, 2025

(65) Prior Publication Data

US 2026/0001737 A1 Jan. 1, 2026

Related U.S. Application Data

(63) Continuation of application No. PCT/CN2023/132394, filed on Nov. 17, 2023.

(51) Int. Cl.
*B65H 18/04* (2006.01)
*B65H 18/02* (2006.01)
(Continued)

(52) U.S. Cl.
CPC ........... *B65H 18/04* (2013.01); *B65H 18/021* (2013.01); *B65H 18/10* (2013.01);
(Continued)

(58) Field of Classification Search
CPC ...... B65H 18/04; B65H 18/021; B65H 18/10; B65H 2301/41392; H01M 10/0409;
(Continued)

(56) References Cited

U.S. PATENT DOCUMENTS 1,047,422 A * 12/1912 Loewy .................. B65B 25/146 53/119
4,559,700 A * 12/1985 Sugalski ................ H01G 13/02 29/730
(Continued)

FOREIGN PATENT DOCUMENTS

CN 207651359 U 7/2018
CN 110459815 A 11/2019
(Continued)

OTHER PUBLICATIONS

International Search Report in the international application No. PCT/CN2023/132394, dated Feb. 21, 2024, 5 pages with English translation.

(Continued)

*Primary Examiner* — Donghai D Nguyen
(74) *Attorney, Agent, or Firm* — K&L Gates LLP

(57) ABSTRACT

The present application relates to a winding needle assembly, a winding apparatus, a production device, and a method for winding electrode assemblies in the field of battery production. The winding needle assembly includes a support seat and a winding needle rotatably connected to the support seat along the needle's axial direction. The winding needle extends outward from the support seat to form multiple winding portions outside the support seat, each configured to wind electrode assemblies. The assembly enables simultaneous winding of multiple electrode assemblies to increase production efficiency. While winding, the support seat reduces the length of the unsupported portion of the needle, enhancing the rigidity and strength of the winding portion.

(Continued)

This structure mitigates deformation of the winding part during the winding process and alleviates issues such as wrinkles, poor alignment, and limited winding speed, thereby improving the quality and efficiency of electrode assembly production.

15 Claims, 6 Drawing Sheets

(51) Int. Cl.
*B65H 18/10* (2006.01)
*H01M 10/04* (2006.01)
*H01M 10/0587* (2010.01)

(52) U.S. Cl.
CPC ... *H01M 10/0409* (2013.01); *H01M 10/0587* (2013.01); *B65H 2301/41392* (2013.01)

(58) Field of Classification Search
CPC .......... H01M 10/0587; Y10T 29/49108; Y10T 29/49112; Y10T 29/53135
See application file for complete search history.

(56) References Cited

U.S. PATENT DOCUMENTS

| | | | | | |
|---|---|---|---|---|---|
| 4,709,472 | A * | 12/1987 | Machida | H01M 6/10 429/94 |
| 6,670,071 | B2 * | 12/2003 | Skinlo | H01M 10/0431 29/623.5 |

FOREIGN PATENT DOCUMENTS

| | | | |
|---|---|---|---|
| CN | 210576164 | U | 5/2020 |
| CN | 212136625 | U | 12/2020 |
| CN | 212257599 | U | 12/2020 |
| CN | 215578687 | U | 1/2022 |
| CN | 114512725 | A | 5/2022 |
| CN | 217822942 | U | 11/2022 |
| JP | 2012062195 | A | 3/2012 |

OTHER PUBLICATIONS

ISA Written Opinion in the international application No. PCT/CN2023/132394, dated Feb. 21, 2024, 8 pages with English translation.

Extended European Search Report, mailed Mar. 12, 2026, for corresponding European Patent Application Serial No. 23935029.1.

* cited by examiner

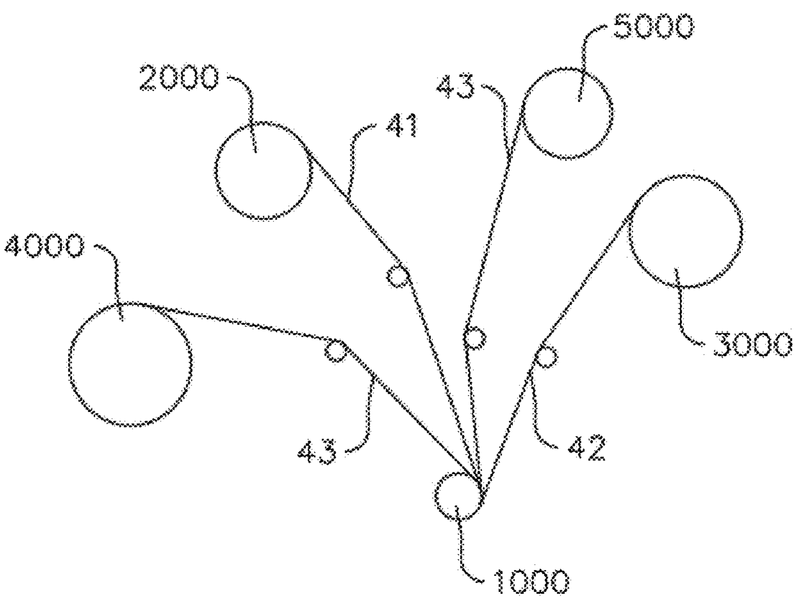
FIG. 8
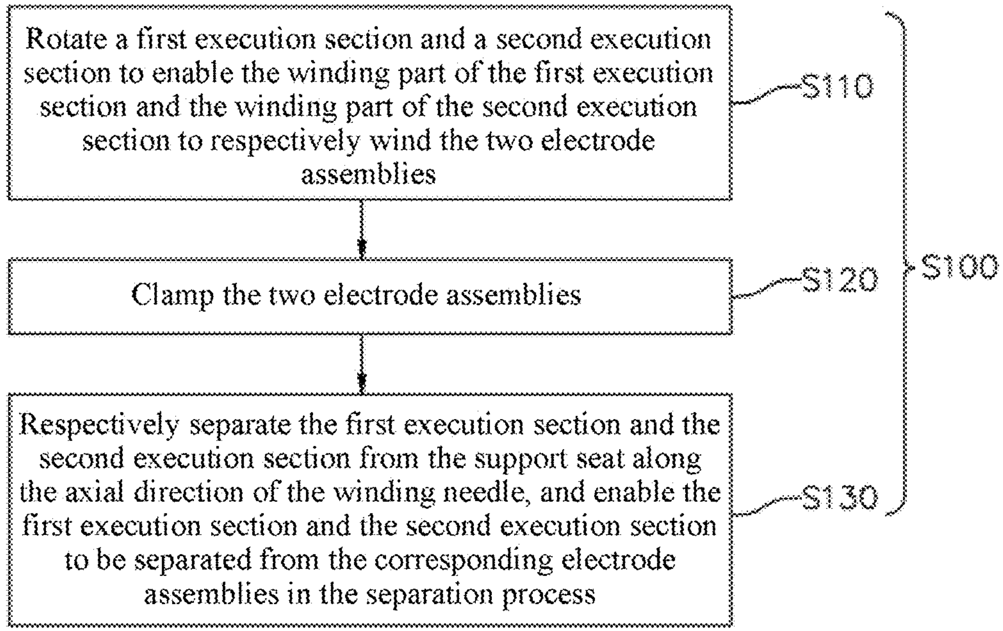
FIG. 9
FIG. 10

WINDING NEEDLE ASSEMBLY, WINDING APPARATUS, PRODUCTION DEVICE, AND METHOD FOR WINDING ELECTRODE ASSEMBLIES

CROSS-REFERENCE TO RELATED APPLICATIONS

The present application is a continuation of International Application No. PCT/CN2023/132394, filed Nov. 17, 2023, which claims priority to Chinese Patent Application No. 2023104839664, filed on Apr. 28, 2023 and entitled "WINDING NEEDLE ASSEMBLY, WINDING APPARATUS, PRODUCTION DEVICE, AND METHOD FOR WINDING ELECTRODE ASSEMBLIES", which is incorporated herein by reference in its entirety.

TECHNICAL FIELD

The present application relates to the technical field of battery production, and specifically, to a winding needle assembly, a winding apparatus, a production device, and a method for winding electrode assemblies.

BACKGROUND

With the development of the new energy technology, the applications of batteries are becoming increasingly widespread. Batteries have relatively high energy density, relatively high safety, long service life and green environmental protection for social environment, have been widely applied to aspects such as passenger vehicles, commercial vehicles, electric bicycles, heavy trucks, energy storage facilities, power exchange stations, engineering manufacturing and intelligent instruments, and also promote the technical development and research on aspects such as communication terminals, medical instruments and energy development.

In the battery production technology, an electrode assembly of a battery cell is usually made in a winding manner to form an electrode assembly having a wound structure. The electrode assembly having the wound structure is usually wound by a winding needle assembly. However, the existing winding needle assembly has relatively low winding efficiency, which is not conducive to improving the production efficiency of the electrode assembly.

SUMMARY

Embodiments of the present application provide a winding needle assembly, a winding apparatus, a production device, and a method for winding electrode assemblies, which can effectively improve the production efficiency of an electrode assembly of a wound structure.

According to a first aspect, an embodiment of the present application provides a winding needle assembly, including a support seat and a winding needle. The winding needle is rotatably connected to the support seat around the axial direction of the winding needle. The winding needle extends out of the support seat along the axial direction of the winding needle, so as to form a plurality of winding parts located outside the support seat on the winding needle. The winding parts are configured to wind electrode assemblies.

In the foregoing technical solution, the winding needle is rotatably disposed on the support seat around the axial direction of the winding needle, and the winding needle extends out of the support seat, so that the winding needle forms a plurality of winding parts located outside the support seat in the axial direction of the winding needle. On the one hand, the winding needle assembly adopting this structure can simultaneously wind a plurality of electrode assemblies by the plurality of winding parts of the winding needle, which is conducive to improving the production efficiency. On the other hand, the winding needle can be supported by the support seat while a plurality of electrode assemblies are wound by the winding needle to shorten the length of a suspended part of the winding needle, so that the rigidity and structural strength of the winding part of the winding needle can be improved to reduce the deformation of the winding part in the process of winding the electrode assembly, thereby relieving the phenomena of wrinkles, poor alignment degree, limited winding speed and the like of the electrode assembly to improve the production quality and production efficiency of the electrode assembly. In addition, on the premise that the rigidity and structural strength of the winding part of the winding needle satisfy requirements, the diameter of the winding part of the winding needle can be further reduced to reduce the size of a winding central hole of the electrode assembly, which is conducive to improving the energy density of the wound electrode assembly.

In some embodiments, the winding needle includes at least two execution sections that are separately disposed. The at least two execution sections include a first execution section and a second execution section. The first execution section and the second execution section are arranged along the axial direction of the winding needle. The execution sections are rotatably connected to the support seat around the axial direction of the winding needle. Each execution section has a winding part.

In the foregoing technical solution, the winding needle is configured with the first execution section and the second execution section that are arranged at an interval along the axial direction of the winding needle and separately disposed. Both the first execution section and the second execution section have the winding parts, so as to enable the winding needle to simultaneously wind two electrode assemblies by the first execution section and the second execution section. On the one hand, the winding needle adopting this structure enables the first execution section and the second execution section to synchronously rotate or independently rotate, which facilitates the diversified production of the winding needle assembly. On the other hand, by configuring the winding needle with the first execution section and the second execution section that are separately disposed, the risk that the winding needle is broken due to a rotational speed difference between the two winding parts can be relieved, and it is convenient to take out the completely wound electrode assembly from the first execution section and the second execution section, which is conducive to reducing the processing difficulty.

In some embodiments, the execution sections are detachably connected to the support seat.

In the foregoing technical solution, the execution sections are configured to be detachably connected to the support seat, so that the first execution section and the second execution section can be respectively extracted from two sides of the support seat, and thus the completely wound electrode assembly can be taken out from the first execution section and the second execution section. The winding needle assembly adopting this structure can effectively reduce the difficulty in taking out the electrode assembly from the execution section, and can relieve the wear on the electrode assembly caused in a process in which the winding needle is extracted from the electrode assembly.

In some embodiments, the winding needle assembly further includes a rotating member. The rotating member is rotatably connected to the support seat around the axial direction of the winding needle. The execution sections are rotatably connected to the rotating member.

In the foregoing technical solution, the winding needle assembly is further provided with a rotating member. The rotating member is rotatably disposed on the support seat. Correspondingly, the execution sections of the winding needle are rotatably connected to the rotating member, so that the execution sections are rotatably connected to the support seat by the rotating member. The structure is simple and convenient to implement. In addition, a rotational speed difference and a torque between the first execution section and the second execution section can be released by the rotating member, thereby reducing the risk that the first execution section and the second execution section interfere with each other and are broken.

In some embodiments, the execution section includes a connecting part and a driving part. The connecting part and the driving part are respectively connected to two ends of the winding part along the axial direction of the winding needle. The connecting part is detachably connected to the rotating member. The driving part is configured to be connected to a driving mechanism.

In the foregoing technical solution, the execution section further has the connecting part and the driving part that are connected to two ends of the winding part. The driving part is configured to be connected to the driving mechanism, so that the driving mechanism can drive the execution section to rotate relative to the support seat, thereby achieving the winding of the electrode assembly. In addition, by detachably connecting the connecting part to the rotating member, after the winding of the electrode assembly is completed, the execution section can be separated from the rotating member at an end having the connecting part, so that the electrode assembly can be taken out from the end having the connecting part of the execution section. In this way, the driving part of the execution section does not need to be separated from the driving mechanism, which is conducive to reducing the difficulty in taking out the electrode assembly from the execution section. Therefore, the production efficiency of the electrode assembly can be improved.

In some embodiments, the connecting part is in inserted fit with the rotating member along the axial direction of the winding needle.

In the foregoing technical solution, the connecting part of the execution section and the rotating member are configured to be in a structure of inserted fit along the axial direction of the winding needle, so as to achieve the detachable connection between the connecting part and the rotating member. In addition, by means of the structure of inserted fit, the execution section can be connected to or separated from the rotating member by just moving the execution section along the axial direction of the winding needle, so that the electrode assembly can be taken out from the execution section, which is conducive to improving the production efficiency of the electrode assembly.

In some embodiments, the rotating member is provided with a slot. The connecting part is rotatably inserted in the slot.

In the foregoing technical solution, the rotating member is provided with the slot for insertion of the connecting part of the execution section, so that the connecting part of the execution section and the rotating member are in inserted fit along the axial direction of the winding needle. The structure is simple and convenient to implement and operate.

In some embodiments, a protrusion projects from a bottom surface of the slot. An end of the connecting part away from the winding part in the axial direction of the winding needle is provided with a locating hole. The protrusion is inserted in the locating hole.

In the foregoing technical solution, the bottom surface of the slot is provided with the protrusion. Correspondingly, one end of the connecting part is provided with the locating hole for insertion of the protrusion, so that when the connecting part is inserted in the slot, a locating function can be achieved, so as to improve the assembly accuracy between the execution section and the rotating member, and further improve the structural stability after the connecting part is inserted in the slot of the rotating member.

In some embodiments, the size of the connecting part is less than the size of the winding part along the radial direction of the winding needle.

In the foregoing technical solution, the radial size of the connecting part of the execution section is set to be less than the radial size of the winding part of the execution section, so that when the electrode assembly is taken out from the end of the execution section having the connecting part, a blocking effect of the connecting part on the electrode assembly can be reduced, so as to take out the electrode assembly from the execution section. In addition, the scraping of the electrode assembly caused by the connecting part can be effectively reduced to reduce the risk of damaging the electrode assembly.

In some embodiments, the support seat is provided with a mounting hole. The mounting hole extends through the support seat along the axial direction of the winding needle. The rotating member is rotatably disposed in the mounting hole.

In the foregoing technical solution, the support seat is provided with the mounting hole for mounting the rotating member, and the mounting hole extends through two sides of the support seat along the axial direction of the winding needle, thereby on the one hand improving the structural stability of the rotating member assembled on the support seat can be improved, and on the other hand facilitating the connection of the first execution section and the second execution section to the rotating member on two sides of the support seat in the axial direction of the winding needle.

In some embodiments, an outer side of the rotating member is sleeved with a bearing. The bearing is disposed between the rotating member and a hole wall of the mounting hole.

In the foregoing technical solution, the bearing is disposed between the rotating member and the hole wall of the mounting hole, which is conducive to improving the effect of rotating the rotating member relative to the support seat, so as to relieve the wear between the rotating member and the support seat.

In some embodiments, the execution section is of a solid structure.

In the foregoing technical solution, the execution section is configured to be of a solid structure, that is, the execution section is of a physical structure, which is conducive to further improving the rigidity and structural strength of the winding part of the execution section, so as to further relieve the deformation of the winding part in the process of winding the electrode assembly, thereby being conducive to improving the winding quality of the electrode assembly.

According to a second aspect, an embodiment of the present application further provides a winding apparatus, including a driving mechanism and the foregoing winding needle assembly. The driving mechanism is connected to the winding needle. The driving mechanism is configured to drive the winding needle to rotate relative to the support seat around the axial direction of the winding needle, so that the winding part winds the electrode assemblies.

In the foregoing technical solution, the winding apparatus is provided with the driving mechanism for driving the winding needle to rotate, so as to enable the winding needle to simultaneously wind two electrode assemblies. The winding apparatus adopting this structure does not need manual participation, which is conducive to improving the degree of automation of the winding apparatus, thereby improving the production efficiency of the electrode assembly.

In some embodiments, the winding needle includes a first execution section and a second execution section that are separately disposed. The first execution section and the second execution section are arranged along the axial direction of the winding needle. The first execution section and the second execution section are rotatably connected to the support seat around the axial direction of the winding needle. Both the first execution section and the second execution section have the winding parts. The driving mechanism includes a first driving member and a second driving member. The first driving member is connected to the first execution section. The first driving member is configured to drive the first execution section to rotate relative to the support seat. The second driving member is connected to the second execution section. The second driving member is configured to drive the second execution section to rotate relative to the support seat.

In the foregoing technical solution, the driving mechanism is provided with the first driving member and the second driving member. The first driving member and the second driving member are respectively connected to the first execution section and the second execution section to drive the first execution section and the second execution section to rotate relative to the support seat. The winding apparatus adopting this structure can reduce the difficulty in assembling the driving mechanism with the first execution section and the second execution section, and enables the first execution section and the second execution section to synchronously rotate or independently rotate under the driving of the driving mechanism, thereby facilitating the diversified production of the winding apparatus.

In some embodiments, the first execution section and the second execution section are both detachably connected to the support seat. The winding apparatus further includes a moving mechanism. The moving mechanism is connected to the first execution section and the second execution section. The moving mechanism is configured to drive the first execution section and the second execution section to be close to or away from each other along the axial direction of the winding needle, so that the first execution section and the second execution section are connected to or separated from the support seat.

In the foregoing technical solution, the first execution section and the second execution section of the winding needle are both detachably connected to the support seat. The winding apparatus is further provided with the moving mechanism connected to the first execution section and the second execution section, so that the moving mechanism can drive the first execution section and the second execution section to be connected to or separated from the support seat along the axial direction of the winding needle, and the first execution section and the second execution section can be automatically extracted from two sides of the support seat. In this way, the completely wound electrode assembly can be taken out from the first execution section and the second execution section, thereby improving the degree of automation of the winding apparatus to improve the production efficiency of the electrode assembly.

According to a third aspect, an embodiment of the present application further provides a production device, including the foregoing winding apparatus.

According to a fourth aspect, an embodiment of the present application further provides a method for winding electrode assemblies, applicable to the foregoing winding needle assembly. The method for winding electrode assemblies includes: rotating the winding needle to enable the two winding parts to respectively wind two electrode assemblies.

In the foregoing technical solution, by rotating the winding needle, two winding parts of the winding needle can simultaneously wind two electrode assemblies, which is conducive to improving the production efficiency of the electrode assembly.

In some embodiments, the winding needle includes the first execution section and the second execution section that are separately disposed. The first execution section and the second execution section are arranged along the axial direction of the winding needle. Both the first execution section and the second execution section are rotatably connected to the support seat around the axial direction of the winding needle. Both the first execution section and the second execution section have the winding parts. The first execution section and the second execution section are detachably connected to the support seat. The rotating the winding needle to enable the two winding parts to respectively wind two electrode assemblies includes: rotating the first execution section and the second execution section to enable the winding part of the first execution section and the winding part of the second execution section to respectively wind the two electrode assemblies; clamping the two electrode assemblies; and respectively separating the first execution section and the second execution section from the support seat along the axial direction of the winding needle, and enabling the first execution section and the second execution section to be separated from the corresponding electrode assemblies in the separation process.

In the foregoing technical solution, following the winding of two electrode assemblies by the first execution section and the second execution section respectively, the two electrode assemblies are clamped, so that in the process of respectively separating the first execution section and the second execution section from the support seat along the axial direction of the winding needle, the first execution section and the second execution section can be respectively taken out from the corresponding electrode assemblies. In this way, the winding needle can be simultaneously taken out from the two electrode assemblies, thereby being conducive to reducing the difficulty in taking out the winding needle from the two electrode assemblies, optimizing the production cycle of taking out the winding needle from the two electrode assemblies, and being conducive to improving the production efficiency of the electrode assembly.

BRIEF DESCRIPTION OF THE DRAWINGS

In order to illustrate the technical solutions in embodiments of the present application more clearly, the following briefly introduces the accompanying drawings required in the embodiments. It should be understood that the following accompanying drawings only show some embodiments of the present application, and therefore should not be considered as limiting the scope of the present application. Those of ordinary skill in the art can also obtain other relevant accompanying drawings according to these accompanying drawings without creative efforts.

FIG. 8 is a schematic structural view of production of an electrode assembly by a production device according to some embodiments of the present application;

FIG. 9 is a schematic flowchart of a method for winding electrode assemblies according to some embodiments of the present application;

FIG. 10 is a schematic flowchart of step S100 in the method for winding electrode assemblies according to some embodiments of the present application;

REFERENCE NUMERALS

Figures 1, 2:
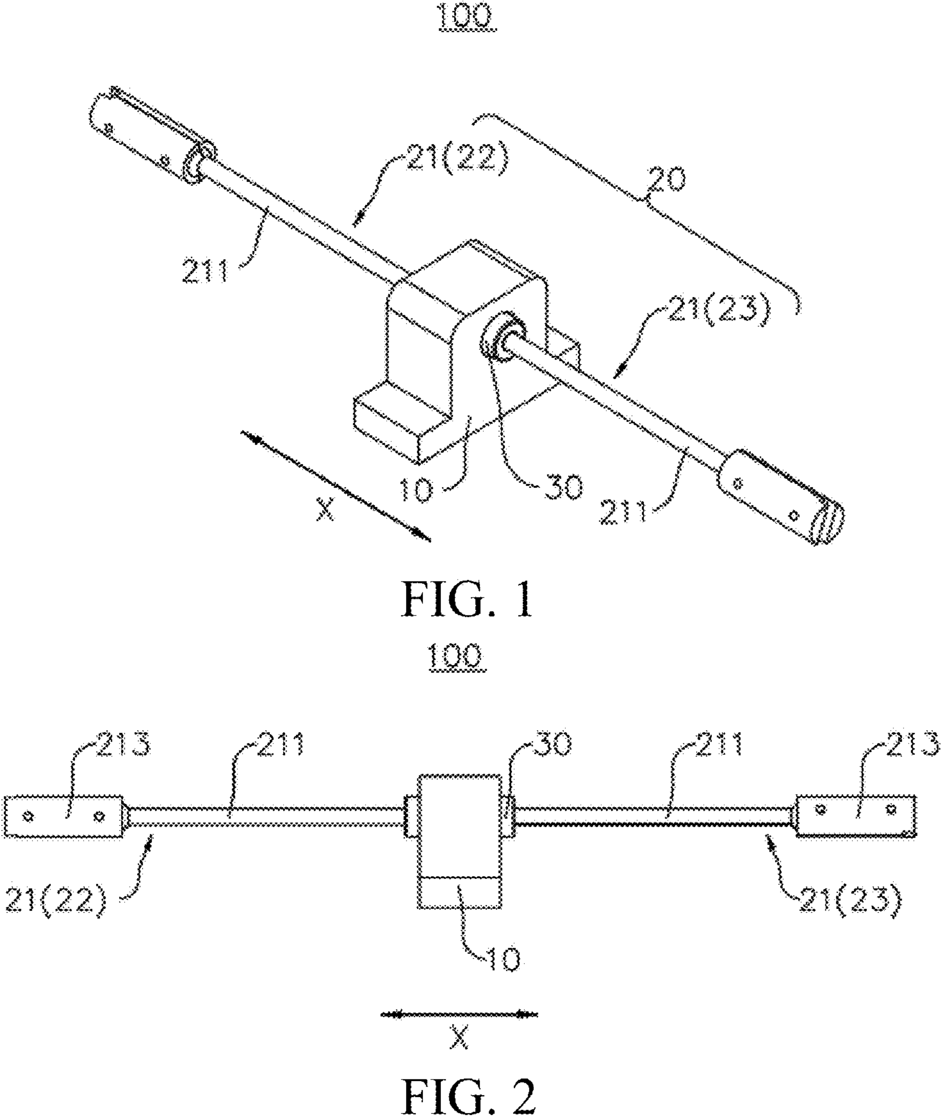
FIG. 1 is a schematic structural view of a winding needle assembly according to some embodiments of the present application.
FIG. 2 is a front view of a winding needle assembly according to some embodiments of the present application.

10000—production device; 1000—winding apparatus; 100—winding needle assembly; 10—support seat; 11—mounting hole; 20—winding needle; 21—execution section; 211—winding part; 212—connecting part; 2121—locating hole; 213—driving part; 22—first execution section; 23—second execution section; 30—rotating member; 31—slot; 32—protrusion; 40—electrode assembly; 41—positive electrode plate; 42—negative electrode plate; 43—spacer; 200—driving mechanism; 201—first driving member; 202—second driving member; 300—moving mechanism; 2000—positive electrode plate roll; 3000—negative electrode plate roll; 4000—first spacer roll; 5000—second spacer roll; X—axial direction of winding needle.

DETAILED DESCRIPTION

In order to make the objectives, technical solutions and advantages of embodiments of the present application clearer, the technical solutions in the embodiments of the present application will be clearly described below with reference to the accompanying drawings in the embodiments of the present application. Apparently, the described embodiments are merely some embodiments of the present application rather than all of the embodiments. All other embodiments obtained by those of ordinary skill in the art based on the embodiments in the present application without any creative effort shall fall within the scope of protection of the present application.

Unless otherwise defined, all technical and scientific terms used in the present application have the same meanings as commonly understood by those skilled in the art of the present application. The terms used in the specification of the present application are only for the purpose of describing specific embodiments, but are not intended to limit the present application. The terms "including" and "having" and any variants thereof in the specification and claims of the present application and in the description of the accompanying drawings are intended to cover non-exclusive inclusion. The terms "first", "second", etc. in the specification and claims of the present application or the above accompanying drawings are used to distinguish different objects, rather than to describe a specific order or primary-secondary relationship.

The reference to "embodiments" in the present application means that specific features, structures or characteristics described with reference to embodiments may be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that unless otherwise clearly specified and defined, the terms "mounting", "connected", "connection" and "attachment" should be broadly understood. For example, the connection may be fixed connection, detachable connection or integrated connection, or may be direct connection, indirect connection through an intermediate medium, or internal communication of two elements. For those of ordinary skill in the art, the specific meanings of the above terms in the present application can be understood according to specific situations.

In the present application, the term "and/or" only describes the association relationship between associated objects, indicating that there may be three relationships. For example, A and/or B may indicate that there are three conditions: A exists alone, A and B exist simultaneously, and B exists alone. In addition, the character "/" in the present application generally means that the associated objects before and after it are in an "or" relationship.

In the embodiments of the present application, the same reference numerals represent the same components, and for the sake of brevity, detailed descriptions of the same components are omitted in different embodiments. It should be understood that the thickness, length, width and other dimensions of various components in the embodiments of the present application shown in the accompanying drawings, as well as the overall thickness, length, width and other dimensions of an integrated apparatus are for illustrative purposes only, and should not constitute any limitation to the present application.

The term "a plurality of" in the present application refers to two or more (including two).

In the embodiments of the present application, a battery cell may be a secondary battery. The secondary battery refers to a battery cell that can be used continually by activating an active material by charging after the battery cell is discharged.

The battery cell may be a lithium-ion battery, a sodium-ion battery, a sodium/lithium-ion battery, a lithium metal battery, a sodium metal battery, a lithium-sulfur battery, a magnesium-ion battery, a nickel-hydrogen battery, a nickel-cadmium battery, a lead storage battery, or the like, which is not limited in the embodiments of the present application.

The battery cell generally includes an electrode assembly. The electrode assembly includes a positive electrode, a negative electrode and a spacer. During charging and discharging of the battery cell, active ions (such as lithium ions) are intercalated and deintercalated back and forth between the positive electrode and the negative electrode. The spacer is disposed between the positive electrode and the negative electrode, which can play a role in preventing a short circuit between the positive electrode and the negative electrode while allowing the active ions to pass through.

In some embodiments, the positive electrode may be a positive electrode plate, and the positive electrode plate may include a positive electrode current collector and a positive electrode active material disposed on at least one surface of the positive electrode current collector.

As an example, the positive electrode current collector has two surfaces opposite to each other in a thickness direction of the positive electrode current collector, and the positive electrode active material is disposed on either or both of the two opposite surfaces of the positive electrode current collector.

As an example, the positive electrode current collector may be a metal foil or a composite current collector. For example, as the metal foil, silver-surface-treated aluminum or stainless steel, stainless steel, copper, aluminum, nickel, carbon electrode, carbon, nickel, or titanium may be used. The composite current collector may include a high molecular material substrate layer and a metal layer. The composite current collector may be formed by forming a metal material (for example, aluminum, aluminum alloy, nickel, nickel alloy, titanium, titanium alloy, silver, silver alloy, or the like) on a high molecular material substrate (for example, a substrate of polypropylene, polyethylene terephthalate, polybutylene terephthalate, polystyrene, polyethylene or the like).

As an example, the positive electrode active material may include at least one of the following materials: lithium-containing phosphates, lithium transition metal oxides, and respective modified compounds thereof. However, the present application is not limited to these materials, and other conventional materials that may be used as positive electrode active materials for batteries may also be used. Only one or a combination of two or more of these positive electrode active materials may be used. An example of the lithium-containing phosphate may include, but is not limited to, at least one of lithium iron phosphate (for example, $LiFePO4$ (also referred to as LFP for short)), a composite material of lithium iron phosphate and carbon, lithium manganese phosphate (for example, $LiMnPO4$), a composite material of lithium manganese phosphate and carbon, lithium manganese iron phosphate, and a composite material of lithium manganese iron phosphate and carbon.

In some embodiments, the negative electrode may be a negative electrode plate, and the negative electrode plate may include a negative electrode current collector.

As an example, the negative electrode current collector may be a metal foil, a foam metal, or a composite current collector. For example, as the metal foil, silver-surface-treated aluminum or stainless steel, stainless steel, copper, aluminum, nickel, carbon electrode, carbon, nickel, or titanium may be used. The foam metal may be foam nickel, foam copper, foam aluminum, foam alloy, foam carbon or the like. The composite current collector may include a high molecular material substrate layer and a metal layer. The composite current collector may be formed by forming a metal material (for example, copper, copper alloy, nickel, nickel alloy, titanium, titanium alloy, silver, silver alloy, or the like) on a high molecular material substrate (for example, a substrate of polypropylene, polyethylene terephthalate, polybutylene terephthalate, polystyrene, or polyethylene).

As an example, the negative electrode plate may include a negative electrode current collector and a negative electrode active material disposed on at least one surface of the negative electrode current collector.

As an example, the negative electrode current collector has two surfaces opposite to each other in a thickness direction of the negative electrode current collector, and the negative electrode active material is disposed on either or both of the two opposite surfaces of the negative electrode current collector.

As an example, the negative electrode active material may be a negative electrode active material well known in the art for a battery cell. As an example, the negative electrode active material may include at least one of the following materials: artificial graphite, natural graphite, soft carbon, hard carbon, a silicon-based material, a tin-based material and lithium titanate.

In some embodiments, the material of the positive electrode current collector may be aluminum, and the material of the negative electrode current collector may be copper.

In some embodiments, the electrode assembly further includes a spacer, and the spacer is disposed between the positive electrode and the negative electrode.

In some embodiments, the spacer is a separator. There may be various types of separators, and any well-known separator with a porous structure having good chemical stability and mechanical stability may be selected.

As an example, the main material of the separator may be selected from at least one of glass fiber, non-woven fabric, polyethylene, polypropylene, polyvinylidene fluoride, and ceramic.

In some embodiments, the spacer is a solid electrolyte. The solid electrolyte is disposed between the positive electrode and the negative electrode, and plays a role in transmitting ions and isolating the positive electrode and the negative electrode simultaneously.

In some embodiments, the battery cell further includes an electrolyte, and the electrolyte plays a role in conducting ions between the positive electrode and the negative electrode. The type of the electrolyte is not specifically limited in the present application, and may be selected according to requirements. The electrolyte may be in a liquid state, a gel state, or a solid state.

In some embodiments, the electrode assembly is of a wound structure. The positive electrode plate and the negative electrode plate are wound into the wound structure.

In some embodiments, the electrode assembly may be in a cylindrical shape, a flat shape, a polygonal prism shape, or the like.

In some embodiments, the electrode assembly is provided with a tab, and the tab may conduct the current out from the electrode assembly. The tab includes a positive tab and a negative tab.

In some embodiments, the battery cell may include a shell. The shell is configured to encapsulate components such as the electrode assembly and the electrolyte. The shell may be a steel shell, an aluminum shell, a plastic shell (for example, polypropylene), a composite metal shell (for example, a copper-aluminum composite shell), an aluminum-plastic film, or the like.

As an example, the battery cell may be a cylindrical battery cell, a prismatic battery cell, a pouch battery cell, or a battery cell in another shape. The prismatic battery cell includes, but is not limited to, a square battery cell, a blade battery cell, and a polygonal prism battery. For example, the polygonal prism battery may be a hexagonal prism battery, or the like.

The battery mentioned in the embodiments of the present application refers to a single physical module including one or more battery cells to provide a higher voltage and capacity.

In some embodiments, the battery may be a battery module. When a plurality of battery cells are provided, the plurality of battery cells are arranged and fixed to form a battery module.

In some embodiments, the battery may be a battery pack, the battery pack includes a box body and a battery cell, and the battery cell or the battery module is accommodated in the box body.

In some embodiments, the box body may be used as a part of a chassis structure of a vehicle. For example, a part of the box body may form at least a part of a floor of the vehicle, or a part of the box body may form at least a part of a cross beam and a longitudinal beam of the vehicle.

In some embodiments, the battery may be an energy storage apparatus. The energy storage apparatus includes an energy storage container, an energy storage electric cabinet, and the like.

For a common battery cell, an electrode assembly is disposed inside the battery cell. The electrode assembly may be made into an electrode assembly having a laminated structure in a laminating manner, or may be made into an electrode assembly having a wound structure in a winding manner. Currently, when an electrode assembly is produced by winding, a positive electrode plate, a negative electrode plate and a spacer are usually wound by a winding needle, so as to form an electrode assembly having a wound structure. However, a winding needle assembly in a related technology can only wind one electrode assembly at a time by a winding needle, resulting in relatively low production efficiency of the electrode assembly. To improve the production efficiency of the electrode assembly, the size of the winding needle is usually lengthened in the related technology, so that the winding needle has a plurality of winding positions, and thus a plurality of electrode assemblies can be simultaneously wound. However, because the rigidity of the winding needle of the winding needle assembly having this structure is insufficient, the phenomenon of deflection deformation often occurs in the process of winding the electrode assembly by the winding needle, which easily causes the phenomena of wrinkles, poor alignment, limited winding speed and the like of the electrode assembly, and is not conducive to improving the production quality and production efficiency of the electrode assembly. If the structural strength of the winding needle needs to be improved to ensure enough rigidity of the winding needle, the diameter of the winding needle needs to be increased. However, an increase in the diameter of the winding needle occupies the volume of the electrode assembly, causing an increase in a winding central hole of the electrode assembly, which is not conducive to improving the energy density of the electrode assembly.

Based on the foregoing consideration, to solve the problems of relatively low production efficiency and poor production quality of the electrode assembly having a wound structure, an embodiment of the present application provides a winding needle assembly. The winding needle assembly includes a support seat and a winding needle. The winding needle is rotatably connected to the support seat around the axial direction of the winding needle. The winding needle extends out of the support seat along the axial direction of the winding needle, so as to form a plurality of winding parts located outside the support seat on the winding needle, and the winding parts are configured to wind electrode assemblies.

In the winding needle assembly having this structure, the winding needle is rotatably disposed on the support seat around the axial direction of the winding needle, and the winding needle extends out of the support seat, so that the winding needle forms a plurality of winding parts located outside the support seat in the axial direction of the winding needle. On the one hand, the winding needle assembly adopting this structure can simultaneously wind a plurality of electrode assemblies by the plurality of winding parts of the winding needle, which is conducive to improving the production efficiency. On the other hand, the winding needle can be supported by the support seat while a plurality of electrode assemblies are wound by the winding needle to shorten the length of a suspended part of the winding needle, so that the rigidity and structural strength of the winding part of the winding needle can be improved to reduce the deformation of the winding part in the process of winding the electrode assembly, thereby relieving the phenomena of wrinkles, poor alignment degree, limited winding speed and the like of the electrode assembly to improve the production quality and production efficiency of the electrode assembly. In addition, on the premise that the rigidity and structural strength of the winding part of the winding needle satisfy requirements, the diameter of the winding part of the winding needle can be further reduced to reduce the size of a winding central hole of the electrode assembly, which is conducive to improving the energy density of the wound electrode assembly.

An embodiment of the present application provides a winding needle assembly, which can improve the phenomena of wrinkles, poor alignment and limited winding speed that often occur in the process of winding the electrode assembly. Theses phenomena cause problems that the production quality of the electrode assembly is poor, the production efficiency is relatively low, and production requirements of the battery cell cannot be satisfied. The following describes the specific structure of the winding needle assembly in detail with reference to the accompanying drawings.

Figure 3:
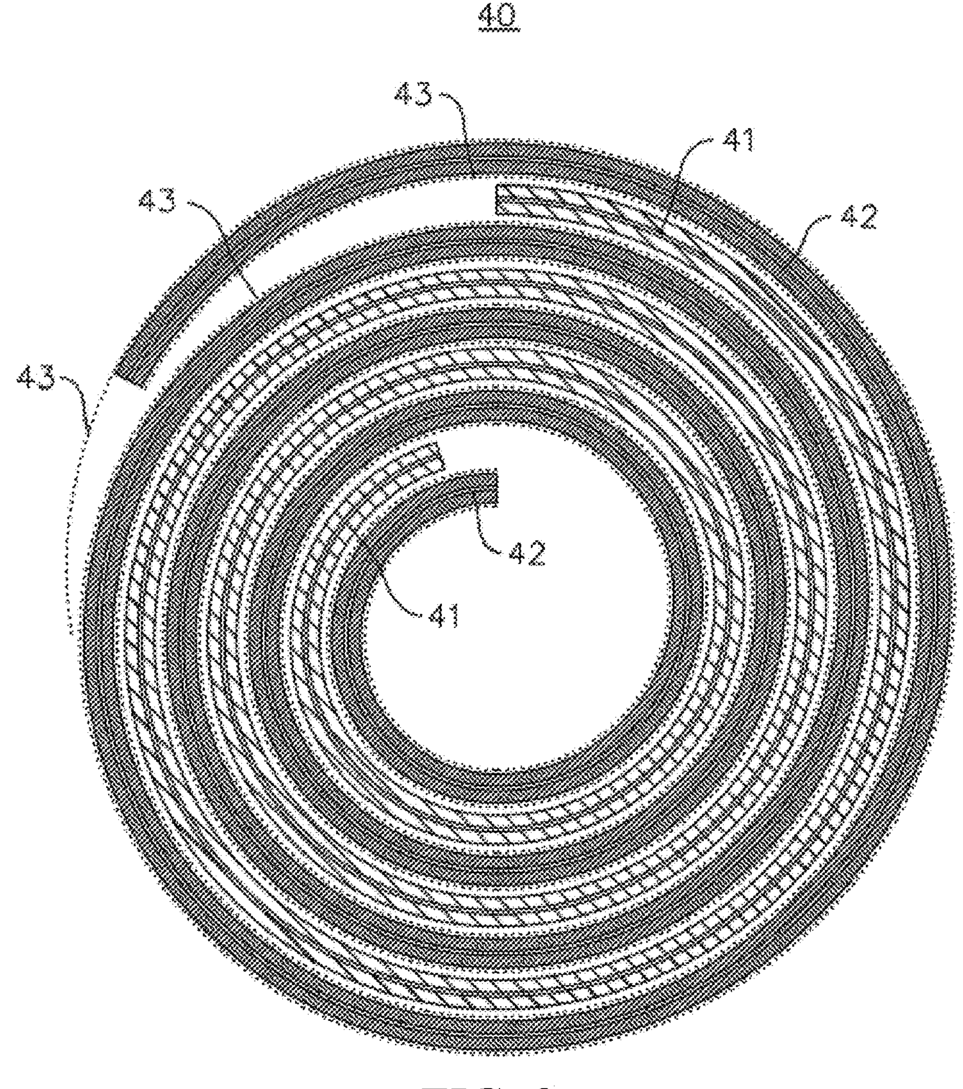
FIG. 3 is a cross-sectional view of an electrode assembly according to some embodiments of the present application.

According to some embodiments of the present application, referring to FIG. 1, FIG. 2 and FIG. 3, FIG. 1 is a schematic structural view of a winding needle assembly 100 according to some embodiments of the present application, FIG. 2 is a front view of a winding needle assembly 100 according to some embodiments of the present application, and FIG. 3 is a cross-sectional view of an electrode assembly 40 according to some embodiments of the present application. The present application provides a winding needle assembly 100. The winding needle assembly 100 includes a support seat 10 and a winding needle 20. The winding needle 20 is rotatably connected to the support seat 10 around the axial direction of the winding needle 20. The winding needle 20 extends out of the support seat 10 along the axial direction X of the winding needle, so as to form a plurality of winding parts 211 located outside the support seat 10 on the winding needle 20. The winding parts 211 are configured to wind electrode assemblies 40.

The winding needle 20 plays a role in winding the electrode assembly 40 by rotating. The winding needle 20 is of a strip-shaped structure. The winding needle 20 may be made of various materials, such as steel or aluminum alloy. The support seat 10 has a function of providing support for the winding needle 20. The support seat 10 may also be made of various materials, such as steel or aluminum alloy.

The winding needle 20 is rotatably connected to the support seat 10 around the axial direction of the winding needle 20. That is, an axis of rotation of the winding needle 20 relative to the support seat 10 is an axis of the winding needle 20. In other words, the axial direction X of the winding needle is an extension direction of the axis of the winding needle 20.

The winding needle 20 extends out of the support seat 10, so as to form a plurality of winding parts 211 located outside the support seat 10 on the winding needle 20. That is, in the axial direction X of the winding needle, the winding needle 20 extends out of multiple sides of the support seat 10, so that the winding needle 20 forms a plurality of regions for winding the electrode assemblies 40 outside the support seat 10. The winding part 211 is a region of the winding needle 20 for winding the electrode assemblies 40.

Exemplarily, in FIG. 1 and FIG. 2, two ends of the winding needle 20 in the axial direction X of the winding needle respectively extend out of two sides of the support seat 10, so as to form two winding parts 211 located at the two sides of the support seat 10 on the winding needle 20. Of course, in other embodiments, the winding needle 20 may also form three, four or five winding parts 211 outside the support seat 10.

Optionally, there may be a plurality of structures of the winding needle 20. The winding needle 20 may be of an integrated structure. That is, the winding needle 20 is of an integral strip-shaped structure. The winding needle 20 is inserted through the support seat 10 along the axial direction X of the winding needle, and two ends of the winding needle 20 respectively extend out of the support seat 10, so as to form a plurality of winding parts 211 located outside the support seat 10 on the winding needle 20. Of course, the winding needle 20 may also be of a split type. That is, the winding needle 20 includes a plurality of execution sections 21 that are separately disposed, each execution section 21 has a winding part 211, and each execution section 21 is rotatably disposed on the support seat 10. Exemplarily, in FIG. 2, the winding needle 20 is of a split structure, and the winding needle 20 includes two execution sections 21 arranged along the axial direction X of the winding needle.

It should be noted that in the process of rotation of the winding needle 20, the amount of deformation of the winding needle 20 is inversely proportional to the diameter of the winding needle 20, and is directly proportional to the suspended length of the winding needle 20 and the applied force. Therefore, the suspended length of the winding needle 20 can be shortened by the support seat 10, so that the amount of deformation of the winding needle 20 in the process of rotation can be reduced.

Exemplarily, in FIG. 1, the lengths of the winding needle 20 extending out of the two sides of the support seat 10 in the axial direction X of the winding needle are equal. That is, in the case of the same length of winding needle 20, the suspended length of the winding needle 20 is shortened by a half. According to a deflection deformation model of the winding needle 20, namely $y_{max}=-5FL^3/6\pi ED^3$ of the deflection deformation model of the winding needle 20 (F is a resultant force applied to the winding needle 20, L is the suspended length of the winding needle 20, E is the elastic modulus of the winding needle 20, and D is the diameter of the winding needle 20), it can be known that in the case of the same length of winding needle 20, the suspended length of the winding needle 20 is shortened by a half, and correspondingly, the deflection deformation of the winding needle 20 is reduced to ⅛ of the original deflection deformation.

In some embodiments, referring to FIG. 3, the electrode assembly 40 is of a wound structure formed by winding. The electrode assembly 40 may include a positive electrode plate 41, a negative electrode plate 42 and a spacer 43. The spacer 43 is located between the positive electrode plate 41 and the negative electrode plate 42 to separate the positive electrode plate 41 and the negative electrode plate 42.

The extension direction of the winding central axis of the electrode assembly 40 is the axial direction X of the winding needle. That is, the axial direction X of the winding needle is perpendicular to a plane in which the winding direction of the electrode assembly 40 is located.

Optionally, the electrode assembly 40 is in a shape of a cylinder. Of course, in other embodiments, the cross section of the electrode assembly 40 may also be in an elliptical shape, or the like.

Exemplarily, the spacer 43 is a separator, and the separator may be made of various materials, such as polypropylene or polyethylene.

The winding needle 20 is rotatably disposed on the support seat 10 around the axial direction of the winding needle 20, and the winding needle 20 extends out of the support seat 10, so that the winding needle 20 forms a plurality of winding parts 211 located outside the support seat 10 in the axial direction of the winding needle 20. On the one hand, the winding needle assembly 100 adopting this structure can simultaneously wind a plurality of electrode assemblies 40 by the plurality of winding parts 211 of the winding needle 20, which is conducive to improving the production efficiency. On the other hand, the winding needle 20 can be supported by the support seat 10 while a plurality of electrode assemblies 40 are wound by the winding needle 20 to shorten the length of a suspended part of the winding needle 20, so that the rigidity and structural strength of the winding part 211 of the winding needle 20 can be improved to reduce the phenomenon of deformation of the winding part 211 in the process of winding the electrode assembly 40, thereby relieving the phenomena of wrinkles, poor alignment degree, limited winding speed and the like of the electrode assembly 40 to improve the production quality and production efficiency of the electrode assembly 40. In addition, on the premise that the rigidity and structural strength of the winding part 211 of the winding needle 20 satisfy requirements, the diameter of the winding part 211 of the winding needle 20 can be further reduced to reduce the size of a winding central hole of the electrode assembly 40, which is conducive to improving the energy density of the wound electrode assembly 40.

Figure 4:
FIG. 4 is a structural exploded view of a winding needle assembly according to some embodiments of the present application.
Figure 4:
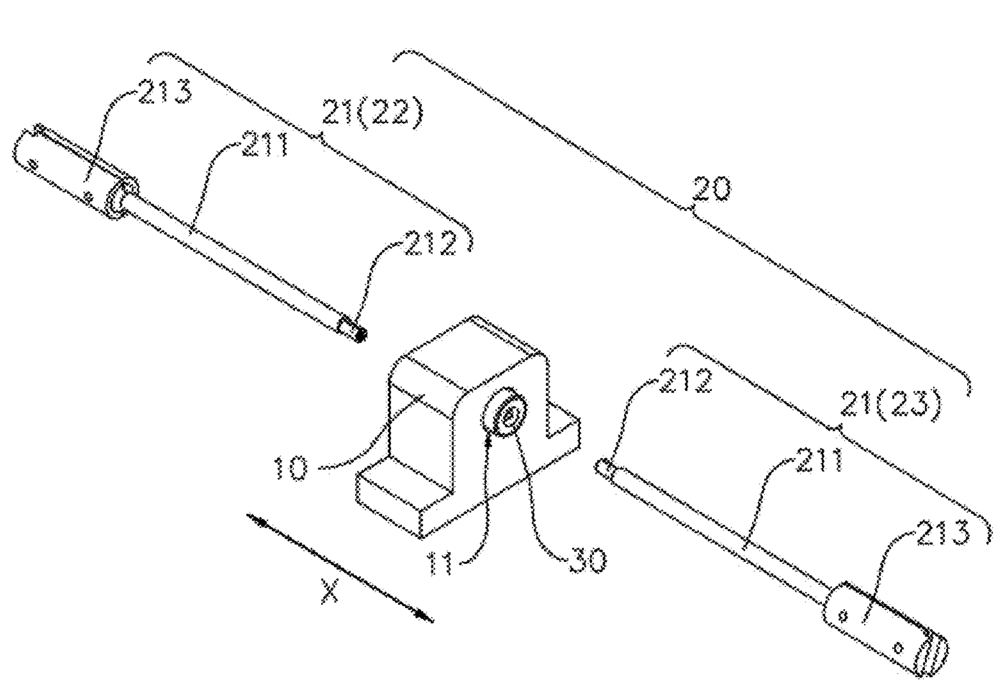

According to some embodiments of the present application, referring to FIG. 1 and FIG. 2 and further referring to FIG. 4, FIG. 4 is a structural exploded view of a winding needle assembly 100 according to some embodiments of the present application. The winding needle 20 includes at least two execution sections 21 that are separately disposed. The at least two execution sections 21 include a first execution section 22 and a second execution section 23. The first execution section 22 and the second execution section 23 are arranged along the axial direction X of the winding needle. The execution sections 21 are rotatably connected to a support seat 10 around the axial direction X of the winding needle. Each execution section 21 has a winding part 211.

The winding needle 20 includes at least two execution sections 21 that are separately disposed. That is, the winding needle 20 may include two, three, four, five or six execution sections 21. Exemplarily, in FIG. 4, the winding needle 20 includes two execution sections 21.

The at least two execution sections 21 include a first execution section 22 and a second execution section 23. That is, the at least two execution sections 21 of the winding needle 20 include a first execution section 22 and a second execution section 23. The first execution section 22 and the second execution section 23 are arranged along the axial direction X of the winding needle. The first execution section 22 and the second execution section 23 are both connected to the support seat 10 at opposite ends in the axial direction X of the winding needle.

The execution sections 21 are rotatably connected to the support seat 10 around the axial direction X of the winding needle. That is, each execution section 21 is rotatably connected to the support seat 10 around the axial direction X of the winding needle. In other words, the first execution section 22 and the second execution section 23 are both rotatably connected to the support seat 10 around the axial direction X of the winding needle.

Optionally, the execution sections 21 may be rotatably connected to the support seat 10 directly or rotatably connected to the support seat 10 indirectly. That is, the execution sections 21 may be rotatably connected to other components, and the other components are then connected to the support seat 10. Exemplarily, in FIG. 4, the execution sections 21 are rotatably connected to the support seat 10 indirectly. The support seat 10 is provided with a rotating member 30. The rotating member 30 is rotatably connected to the support seat 10. The execution sections 21 are connected to the rotating member 30, so that the execution sections 21 are rotatably disposed on the support seat 10 around the axial direction X of the winding needle by the rotating member 30.

Each execution section 21 has a winding part 211. That is, each execution section 21 in at least two execution sections 21 of the winding needle 20 has a winding part 211 for winding the electrode assembly 40. In other words, both the first execution section 22 and the second execution section 23 have winding parts 211 for winding the electrode assembly 40, so that the winding needle 20 forms two winding parts 211 in the axial direction X of the winding needle and on the two sides of the support seat 10.

The winding needle 20 is configured with the first execution section 22 and the second execution section 23 that are arranged at an interval along the axial direction X of the winding needle and that are separately disposed, and both the first execution section 22 and the second execution section 23 have winding parts 211, so as to enable the winding needle 20 to simultaneously wind two electrode assemblies 40 by the first execution section 22 and the second execution section 23. On the one hand, the winding needle 20 adopting this structure enables the first execution section 22 and the second execution section 23 to synchronously rotate or independently rotate, which facilitates the diversified production of the winding needle assembly 100. On the other hand, by configuring the winding needle 20 with the first execution section 22 and the second execution section 23 that are separately disposed, the risk that the winding needle 20 is broken due to a rotational speed difference between the two winding parts 211 can be relieved, and it is convenient to take out the completely wound electrode assembly 40 from the first execution section 22 and the second execution section 23, which is conducive to reducing the processing difficulty.

According to some embodiments of the present application, referring to FIG. 4, the execution sections 21 are detachably connected to the support seat 10.

The execution sections 21 are connected to the support seat 10 in a detachable connection manner, and then, the execution sections 21 can be separated from the support seat 10, so that the execution section 21 can be extracted from the completely wound electrode assembly 40 by moving the execution section 21, thereby achieving the unloading of the electrode assembly 40.

It should be noted that when the execution sections 21 are rotatably connected to the support seat 10 directly, the execution sections 21 may be detachably connected to the support seat 10. When the execution sections 21 are rotatably connected to the support seat 10 indirectly, for example, in FIG. 4, when the execution sections 21 are rotatably disposed on the support seat 10 by the rotating member 30, the execution sections 21 may be detachably connected to the rotating member 30, so that the execution sections 21 are detachably connected to the support seat 10.

Exemplarily, there may be a plurality of detachable connection structures between the execution section 21 and the support seat 10, such as snap fit and bolt connection.

The execution sections 21 are configured to be detachably connected to the support seat 10, so that the first execution section 22 and the second execution section 23 can be respectively extracted from two sides of the support seat 10, and the completely wound electrode assembly 40 can be taken out from the first execution section 22 and the second execution section 23. The winding needle assembly 100 adopting this structure can effectively reduce the difficulty in taking out the electrode assembly 40 from the execution section 21, and can relieve the wear on the electrode assembly 40 caused in a process in which the winding needle 20 is extracted from the electrode assembly 40.

According to some embodiments of the present application, referring to FIG. 1, FIG. 2 and FIG. 4, the winding needle assembly 100 may further include the rotating member 30. The rotating member 30 is rotatably connected to the support seat 10 around the axial direction X of the winding needle. The execution sections 21 are rotatably connected to the rotating member 30.

The support seat 10 is provided with the rotating member 30, and the rotating member 30 is rotatably connected to the support seat 10 around the axial direction X of the winding needle, so that after the execution sections 21 are connected to the rotating member 30, the execution sections 21 can be rotatably disposed on the support seat 10 along the axial direction X of the winding needle.

Exemplarily, in the embodiments of the present application, the execution sections 21 may also be rotatably connected to the rotating member 30, so that the execution sections 21 can rotate relative to the rotating member 30 around the axial direction X of the winding needle, and the rotating member 30 can also rotate relative to the support seat 10 around the axial direction X of the winding needle. Of course, in other embodiments, the execution section 21 may also be of a structure fixedly connected to the rotating member 30. That is, the execution section 21 can rotate relative to the support seat 10 around the axial direction X of the winding needle as long as the rotating member 30 is configured to rotate relative to the support seat 10 around the axial direction X of the winding needle.

It should be noted that in an embodiment in which the winding needle 20 is of an integrated structure, the winding needle 20 may also be rotatably connected to the support seat 10 by the rotating member 30, and the winding needle 20 extends through two ends of the rotating member 30 along the axial direction X of the winding needle.

The winding needle assembly 100 is further provided with the rotating member 30. The rotating member 30 is rotatably disposed on the support seat 10. Correspondingly, the execution sections 21 of the winding needle 20 are rotatably connected to the rotating member 30, so that the execution sections 21 are rotatably connected to the support seat 10 by the rotating member 30. The structure is simple and convenient to implement. In addition, a rotational speed difference and a torque between the first execution section 22 and the second execution section 23 can be released by the rotating member 30, thereby reducing the risk that the first execution section 22 and the second execution section 23 interfere with each other and are broken.

Figure 5:
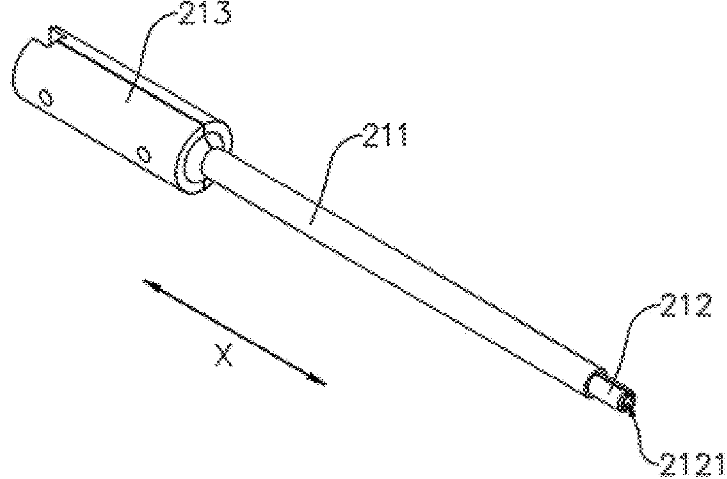
FIG. 5 is a schematic structural view of an execution section of a winding needle according to some embodiments of the present application.

According to some embodiments of the present application, referring to FIG. 4 and further referring to FIG. 5, FIG. 5 is a schematic structural view of an execution section 21 of a winding needle 20 according to some embodiments of the present application. The execution section 21 includes a connecting part 212 and a driving part 213. The connecting part 212 and the driving part 213 are respectively connected to two ends of the winding part 211 along the axial direction X of the winding needle. The connecting part 212 is detachably connected to the rotating member 30. The driving part 213 is configured to be connected to a driving mechanism 200.

The connecting part 212 and the driving part 213 are respectively connected to two ends of the winding part 211 along the axial direction X of the winding needle. That is, the connecting part 212, the winding part 211 and the driving part 213 are sequentially connected in the axial direction X of the winding needle. The winding part 211 is a part of the execution section 21 of the winding needle 20 for winding and processing the electrode assembly 40. The connecting part 212 is a part of the execution section 21 of the winding needle 20 configured to be connected to the support seat 10, so that the support seat 10 can provide support for the winding needle 20. The driving part 213 is a part of the execution section 21 of the winding needle 20 configured to be connected to the driving mechanism 200. The driving mechanism 200 is configured to drive the execution section 21 of the winding needle 20 to rotate, so that the execution section 21 of the winding needle 20 can rotate relative to the support seat 10 around the axial direction X of the winding needle under the driving of the driving mechanism 200, so as to achieve the winding of the electrode assembly 40.

The connecting part 212 is detachably connected to the rotating member 30. That is, the connecting part 212 of the execution section 21 and the rotating member 30 are detachably connected, so that the execution section 21 is detachably connected to the support seat 10.

Exemplarily, there may be a plurality of detachable connection structures between the connecting part 212 and the rotating member 30, such as snap fit or bolt connection.

The execution section 21 further has the connecting part 212 and the driving part 213 that are connected to two ends of the winding part 211. The driving part 213 is configured to be connected to the driving mechanism 200, so that the driving mechanism 200 can drive the execution section 21 to rotate relative to the support seat 10, thereby achieving the winding of the electrode assembly 40. In addition, by detachably connecting the connecting part 212 to the rotating member 30, after the winding of the electrode assembly 40 is completed, the execution section 21 can be separated from the rotating member 30 at an end having the connecting part 212, so that the electrode assembly 40 can be taken out from the end having the connecting part 212 of the execution section 21. In this way, the driving part 213 of the execution section 21 does not need to be separated from the driving mechanism 200, which is conducive to reducing the difficulty in taking out the electrode assembly 40 from the execution section 21. Therefore, the production efficiency of the electrode assembly 40 can be improved.

According to some embodiments of the present application, referring to FIG. 1 and FIG. 4, the connecting part 212 is in inserted fit with the rotating member 30 along the axial direction X of the winding needle.

The connecting part 212 of the execution section 21 is of a structure that is in inserted fit with the rotating member 30 along the axial direction X of the winding needle, so that the connecting part 212 of the execution section 21 is detachably connected to the rotating member 30, thereby facilitating the separation of the execution section 21 from the rotating member 30 along the axial direction X of the winding needle.

The connecting part 212 of the execution section 21 and the rotating member 30 are configured to be in a structure of inserted fit along the axial direction X of the winding needle, so as to achieve the detachable connection between the connecting part 212 and the rotating member 30. In addition, by means of the structure of inserted fit, the execution section 21 can be connected to or separated from the rotating member 30 by just moving the execution section 21 along the axial direction X of the winding needle, so that the electrode assembly 40 can be taken out from the execution section 21, which is conducive to improving the production efficiency of the electrode assembly 40.

In some embodiments, referring to FIG. 4 and FIG. 5, the rotating member 30 is provided with a slot 31, and the connecting part 212 is rotatably inserted in the slot 31.

The rotating member 30 is provided with the slot 31 for insertion of the connecting part 212, and the connecting part 212 and the slot 31 of the rotating member 30 are not in clearance fit, so that the connecting part 212 of the execution section 21 can be detachably connected to the rotating member 30, and the execution section 21 can be rotatably disposed on the rotating member 30 around the axial direction X of the winding needle. Of course, in other embodiments, the slot 31 may also be disposed on the connecting part 212 of the execution section 21. Correspondingly, the rotating member 30 is provided with an inserting part configured to be in inserted fit with the connecting part 212.

Figure 6:
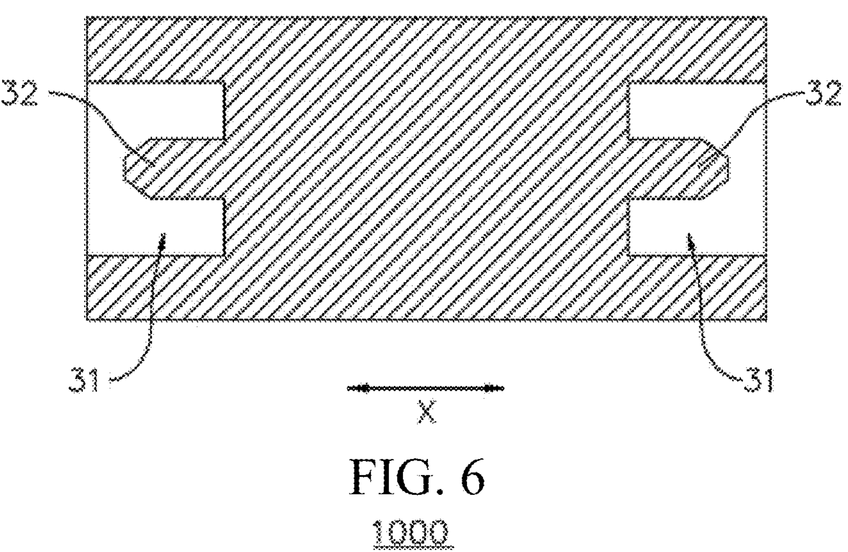
FIG. 6 is a cross-sectional view of a rotating member of a winding needle assembly according to some embodiments of the present application.

In FIG. 6, slots 31 are provided at both ends of the rotating member 30 in the axial direction X of the winding needle. The two slots 31 are respectively used for insertion of the connecting part 212 of the first execution section 22 and the connecting part 212 of the second execution section 23.

The rotating member 30 is provided with the slot 31 for insertion of the connecting part 212 of the execution section 21, so that the connecting part 212 of the execution section 21 and the rotating member 30 are in inserted fit along the axial direction X of the winding needle. The structure is simple and convenient to implement and operate.

In some embodiments, referring to FIG. 4 and FIG. 5 and further referring to FIG. 6, FIG. 6 is a cross-sectional view of a rotating member 30 of a winding needle assembly 100 according to some embodiments of the present application. A protrusion 32 projects from bottom surface of the slot 31. An end of the connecting part 212 away from the winding part 211 in the axial direction X of the winding needle is provided with a locating hole 2121. The protrusion 32 is inserted in the locating hole 2121.

The bottom surface of the slot 31 is provided with the protrusion 32, and correspondingly, one end of the connecting part 212 is provided with the locating hole 2121 for insertion of the protrusion 32, so that when the connecting part 212 is inserted in the slot 31, a locating function can be achieved, so as to improve the assembly accuracy between the execution section 21 and the rotating member 30, and further improve the structural stability when the connecting part 212 is inserted in the slot 31 of the rotating member 30.

According to some embodiments of the present application, referring to FIG. 4 and FIG. 5, the size of the connecting part 212 is less than the size of the winding part 211 along the radial direction of the winding needle 20.

The size of the connecting part 212 is less than the size of the winding part 211. That is, a projection area of the connecting part 212 is less than a projection area of the winding part 211 in the axial direction X of the winding needle. Exemplarily, the execution section 21 of the winding needle 20 is of a cylindrical structure. That is, the diameter of the connecting part 212 is less than the diameter of the winding part 211.

The radial size of the connecting part 212 of the execution section 21 is set to be less than the radial size of the winding part 211 of the execution section 21, so that when the electrode assembly 40 is taken out from the end of the execution section 21 having the connecting part 212, a blocking effect of the connecting part 212 on the electrode assembly 40 can be reduced, so as to take out the electrode assembly 40 from the execution section 21. In addition, the scraping of the electrode assembly 40 caused by the connecting part 212 can be effectively reduced to reduce the risk of damaging the electrode assembly 40.

According to some embodiments of the present application, referring to FIG. 2 and FIG. 4, the support seat 10 is provided with a mounting hole 11. The mounting hole 11 extends through the support seat 10 along the axial direction X of the winding needle. The rotating member 30 is rotatably disposed in the mounting hole 11.

The mounting hole 11 extends through the support seat 10 along the axial direction X of the winding needle. That is, the mounting hole 11 is of a structure extending along the axial direction X of the winding needle, and extends through two sides of the support seat 10 in the axial direction X of the winding needle.

The rotating member 30 is rotatably inserted in the mounting hole 11 along the axial direction X of the winding needle, and two ends of the rotating member 30 in the axial direction X of the winding needle respectively extend out of two sides of the support seat 10, so that the rotating member 30 is connected to the execution section 21.

The support seat 10 is provided with the mounting hole 11 for mounting the rotating member 30. The mounting hole 11 extends through two sides of the support seat 10 along the axial direction X of the winding needle, thereby on the one hand improving the structural stability of the rotating member 30 assembled on the support seat 10 can be improved, and on the other hand facilitating the connection of the first execution section 22 and the second execution section 23 to the rotating member 30 on two sides of the support seat 10 in the axial direction X of the winding needle.

In some embodiments, still referring to FIG. 4, an outer side of the rotating member 30 is sleeved with a bearing (not shown). The bearing is disposed between the rotating member 30 and a hole wall of the mounting hole 11. In other words, the rotating member 30 is rotatably connected to the support seat 10 by the bearing.

The bearing is disposed between the rotating member 30 and the hole wall of the mounting hole 11, which is conducive to improving the effect of rotating the rotating member 30 relative to the support seat 10, so as to relieve the wear between the rotating member 30 and the support seat 10.

In some embodiments, the execution section 21 is of a solid structure. In other words, the first execution section 22 and the second execution section 23 of the winding needle 20 both have a solid structure.

The execution section 21 is configured to be of a solid structure. That is, the execution section 21 is of a physical structure, which is conducive to further improving the rigidity and structural strength of the winding part 211 of the execution section 21, so as to further relieve the phenomenon of deformation of the winding part 211 in the process of winding the electrode assembly 40, thereby being conducive to improving the winding quality of the electrode assembly 40.

Figure 7:
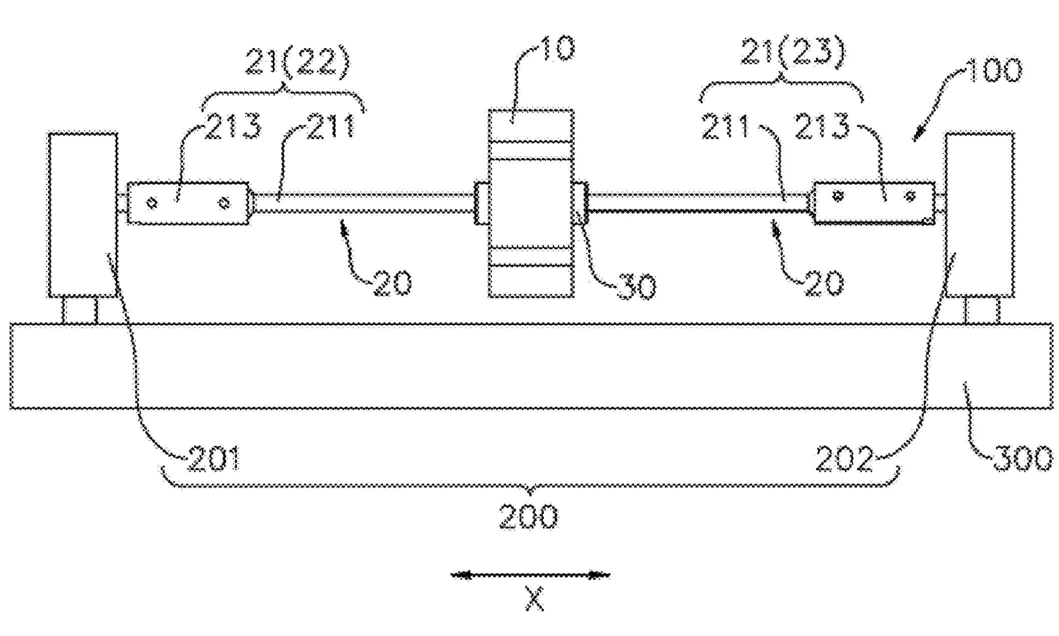
FIG. 7 is a schematic structural view of a winding apparatus according to some embodiments of the present application.

According to some embodiments of the present application, referring to FIG. 1 and further referring to FIG. 7, FIG. 7 is a schematic structural view of a winding apparatus 1000 according to some embodiments of the present application. The present application further provides a winding apparatus 1000. The winding apparatus 1000 includes a driving mechanism 200 and the winding needle assembly 100 according to any one of the foregoing solutions. The driving mechanism 200 is connected to the winding needle 20. The driving mechanism 200 is configured to drive the winding needle 20 to rotate relative to the support seat 10 around the axial direction X of the winding needle, so that the winding part 211 winds the electrode assembly 40.

Referring to FIG. 3, the driving mechanism 200 of the winding apparatus 1000 is configured to drive the winding needle 20 to rotate, so that the winding part 211 of the winding needle 20 winds the positive electrode plate 41, the negative electrode plate 42 and the spacer 43, so as to form the electrode assembly 40 having a wound structure.

The winding apparatus 1000 is provided with the driving mechanism 200 for driving the winding needle 20 to rotate, so as to enable the winding needle 20 to simultaneously wind two electrode assemblies 40. The winding apparatus 1000 adopting this structure does not need manual participation, which is conducive to improving the degree of automation of the winding apparatus 1000, thereby improving the production efficiency of the electrode assembly 40.

According to some embodiments of the present application, referring to FIG. 4 and FIG. 7, the winding needle 20 includes a first execution section 22 and a second execution section 23 that are separately disposed. The first execution section 22 and the second execution section 23 are arranged along the axial direction X of the winding needle. The first execution section 22 and the second execution section 23 are rotatably connected to the support seat 10 around the axial direction X of the winding needle. Both the first execution section 22 and the second execution section 23 have winding parts 211. The driving mechanism 200 includes a first driving member 201 and a second driving member 202. The first driving member 201 is connected to the first execution section 22. The first driving member 201 is configured to drive the first execution section 22 to rotate relative to the support seat 10. The second driving member 202 is connected to the second execution section 23. The second driving member 202 is configured to drive the second execution section 23 to rotate relative to the support seat 10.

The driving mechanism 200 is respectively provided with the first driving member 201 and the second driving member 202 corresponding to the first execution section 22 and the second execution section 23 of the winding needle 20. The first driving member 201 and the second driving member 202 are respectively connected to the first execution section 22 and the second execution section 23, so that the first execution section 22 and the second execution section 23 can be respectively driven to rotate relative to the support seat 10, so as to complete the simultaneous winding of the two electrode assemblies 40.

Exemplarily, there may be various structures of the first driving member 201 and the second driving member 202, such as a motor or a hydraulic motor.

The driving mechanism 200 is provided with the first driving member 201 and the second driving member 202. The first driving member 201 and the second driving member 202 are respectively connected to the first execution section 22 and the second execution section 23 to drive the first execution section 22 and the second execution section 23 to rotate relative to the support seat 10. The winding apparatus 1000 adopting this structure can reduce the difficulty in assembling the driving mechanism 200 with the first execution section 22 and the second execution section 23, and enables the first execution section 22 and the second execution section 23 to synchronously rotate or independently rotate under the driving of the driving mechanism 200, thereby facilitating the diversified production of the winding apparatus 1000.

In some embodiments, still referring to FIG. 4 and FIG. 7, both the first execution section 22 and the second execution section 23 are detachably connected to the support seat 10. The winding apparatus 1000 further includes a moving mechanism 300. The moving mechanism 300 is connected to the first execution section 22 and the second execution section 23. The moving mechanism 300 is configured to drive the first execution section 22 and the second execution section 23 to be close to or away from each other along the axial direction X of the winding needle, so that the first execution section 22 and the second execution section 23 are connected to or separated from the support seat 10.

The first driving member 201 and the second driving member 202 are both connected to the moving mechanism 300, so that the moving mechanism 300 is connected to the first execution section 22 and the second execution section 23 respectively by the first driving member 201 and the second driving member 202. Therefore, by using the moving mechanism 300 to drive the first driving member 201 and the second driving member 202 to be close to or away from each other along the axial direction X of the winding needle, the first execution section 22 and the second execution section 23 can be driven to be close to or away from each other along the axial direction X of the winding needle.

Exemplarily, in FIG. 7, the moving mechanism 300 is a bidirectional cylinder. Of course, the structure of the moving mechanism 300 is not limited to this. In other embodiments, the moving mechanism 300 may also be of another structure. For embodiment, the moving mechanism 300 is an electric push rod, or the like.

The first execution section 22 and the second execution section 23 of the winding needle 20 are both detachably connected to the support seat 10. The winding apparatus 1000 is further provided with the moving mechanism 300 connected to the first execution section 22 and the second execution section 23, so that the moving mechanism 300 can drive the first execution section 22 and the second execution section 23 to be connected to or separated from the support seat 10 along the axial direction X of the winding needle, and the first execution section 22 and the second execution section 23 can be automatically extracted from two sides of the support seat 10. In this way, the completely wound electrode assembly 40 can be taken out from the first execution section 22 and the second execution section 23, thereby improving the degree of automation of the winding apparatus 1000 to improve the production efficiency of the electrode assembly 40.

According to some embodiments of the present application, the present application further provides a production device 10000. Referring to FIG. 8, FIG. 8 is a schematic structural view of production of an electrode assembly 40 by a production device 10000 according to some embodiments of the present application. The production device 10000 includes the winding apparatus 1000 according to any one of the foregoing solutions. The production device is configured to produce the electrode assembly 40.

The electrode assembly 40 is formed by winding one positive electrode plate 41, one negative electrode plate 42, and two spacers 43. The production device 10000 further includes a plurality of positive electrode plate rolls 2000, a plurality of negative electrode plate rolls 3000, a plurality of first spacer rolls 4000, and a plurality of second spacer rolls 5000. The positive electrode plate rolls 2000 are configured to provide the positive electrode plate 41. The negative electrode plate rolls 3000 are configured to provide the negative electrode plate 42. The first spacer rolls 4000 are configured to provide a spacer 43. The second spacer rolls 5000 are configured to provide another spacer 43. Therefore, the winding apparatus 1000 can simultaneously wind the positive electrode plate 41, the negative electrode plate 42, and the two spacers 43 that are respectively provided by the plurality of positive electrode plate rolls 2000, the plurality of negative electrode plate rolls 3000, the plurality of first spacer rolls 4000, and the plurality of second spacer rolls 5000 into a plurality of electrode assemblies 40.

According to some embodiments of the present application, referring to FIG. 1 to FIG. 6, the present application provides a winding needle assembly 100. The winding needle assembly 100 includes the support seat 10, the rotating member 30, and the winding needle 20. The support seat 10 is provided with the mounting hole 11. The mounting hole 11 extends through the support seat 10 along the axial direction X of the winding needle. The rotating member 30 is rotatably disposed in the mounting hole 11 around the axial direction X of the winding needle. The outer side of the rotating member 30 is sleeved with the bearing. The bearing is disposed between the rotating member 30 and the hole wall of the mounting hole 11. The winding needle 20 includes two execution sections 21 that are separately disposed. The execution section 21 is of a solid structure. The two execution sections 21 are respectively the first execution section 22 and the second execution section 23. The two execution sections 21 are arranged along the axial direction X of the winding needle. The execution sections 21 are rotatably connected to the rotating member 30 around the axial direction X of the winding needle. The execution sections 21 are detachably connected to the rotating member 30. The execution section 21 includes the connecting part 212, the winding part 211, and the driving part 213 that are sequentially connected along the axial direction X of the winding needle. The rotating member 30 is provided with the slot 31. The connecting part 212 is rotatably inserted in the slot 31. The winding part 211 is located on one side of the support seat 10 in the axial direction X of the winding needle. The winding part 211 is configured to wind the electrode assembly 40. The driving part 213 is configured to be connected to the driving mechanism 200, so as to drive the execution section 21 to rotate relative to the support seat 10 by the driving mechanism 200. The protrusion 32 projects from the bottom surface of the slot 31. The end of the connecting part 212 away from the winding part 211 in the axial direction X of the winding needle is provided with the locating hole 2121. The protrusion 32 is inserted in the locating hole 2121.

According to some embodiments of the present application, the present application further provides a method for winding electrode assemblies 40, applicable to the winding needle assembly 100 according to any one of the foregoing solutions. Referring to FIG. 1 and FIG. 4 and further referring to FIG. 9, FIG. 9 is a schematic flowchart of a method for winding electrode assemblies 40 according to some embodiments of the present application. The method for winding electrode assemblies 40 includes:

S100: rotate the winding needle 20 to enable the two winding parts 211 to respectively wind two electrode assemblies 40.

The winding needle 20 includes two execution sections 21, which are respectively the first execution section 22 and the second execution section 23 that are arranged along the axial direction X of the winding needle. Both the first execution section 22 and the second execution section 23 have the winding parts 211. That is, by rotating the first execution section 22 and the second execution section 23 of the winding needle 20, the first execution section 22 and the second execution section 23 can be used to respectively wind the corresponding electrode assemblies 40.

In the foregoing winding method, by rotating the winding needle 20, the two winding parts 211 of the winding needle 20 can simultaneously wind two electrode assemblies 40, which is conducive to improving the production efficiency of the electrode assembly 40.

Figures 11, 12, 13:
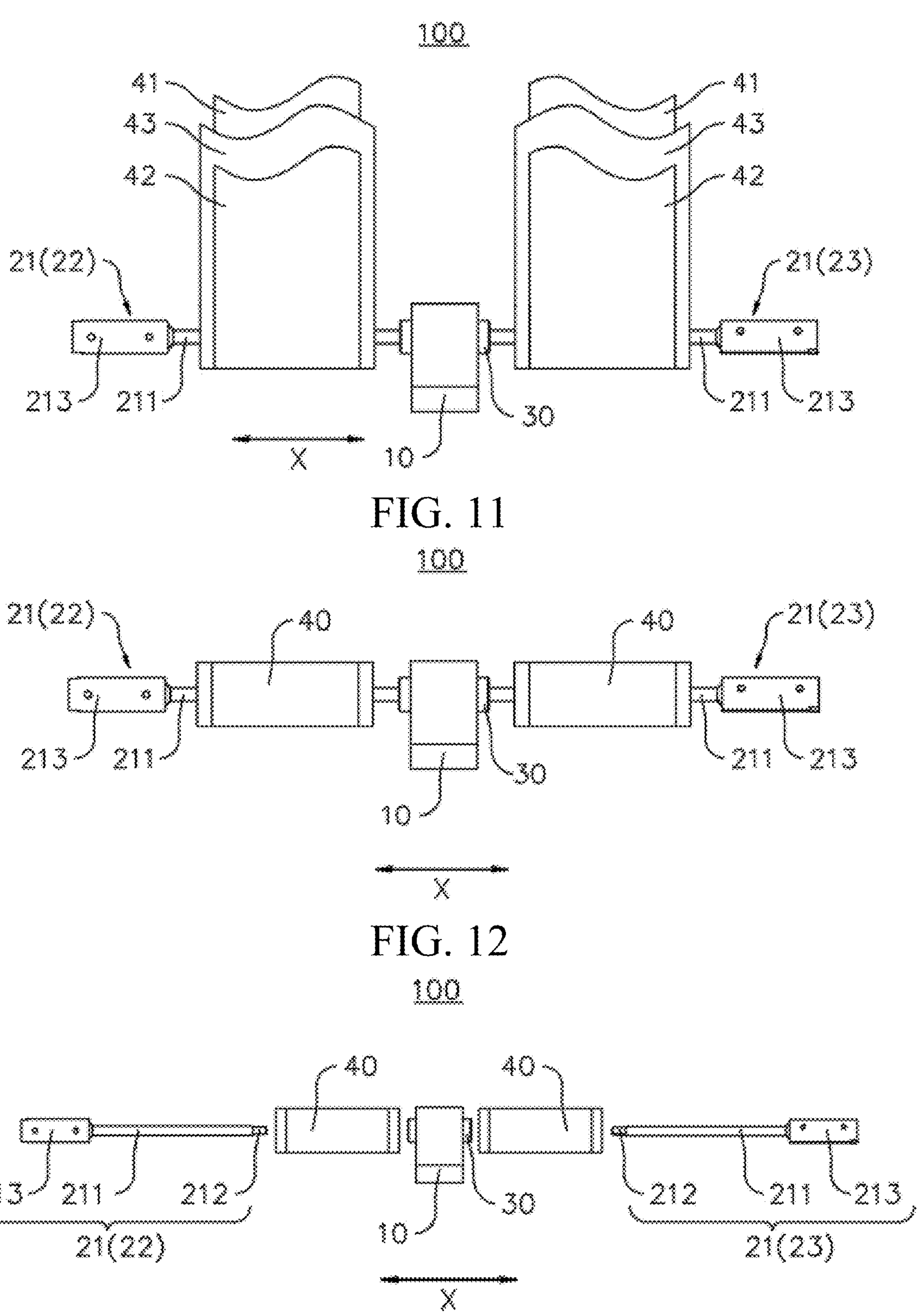
FIG. 11 is a schematic structural view of a winding needle assembly according to some embodiments of the present application when winding electrode assemblies.
FIG. 12 is a schematic structural view of a winding needle assembly according to some embodiments of the present application after completion of winding the electrode assemblies.
FIG. 13 is a schematic structural view of the winding needle assembly according to some embodiments of the present application when removing the electrode assemblies.

According to some embodiments of the present application, referring to FIG. 1, FIG. 2 and FIG. 4, the winding needle 20 includes the first execution section 22 and the second execution section 23 that are separately disposed. The first execution section 22 and the second execution section 23 are arranged along the axial direction X of the winding needle. The first execution section 22 and the second execution section 23 are rotatably connected to the support seat 10 around the axial direction X of the winding needle. Both the first execution section 22 and the second execution section 23 have the winding parts 211, and the first execution section 22 and the second execution section 23 are detachably connected to the support seat 10. Referring to FIG. 10, FIG. 10 is a schematic flowchart of step S100 in the method for winding electrode assemblies 40 according to some embodiments of the present application. The step S100 of rotating a winding needle 20 to enable two winding parts 211 to respectively wind two electrode assemblies 40 includes:

S110: rotate the first execution section 22 and the second execution section 23 to enable the winding part 211 of the first execution section 22 and the winding part 211 of the second execution section 23 to respectively wind the two electrode assemblies 40 (referring to FIG. 11 and FIG. 12, FIG. 11 is a schematic structural view of the winding needle assembly 100 according to some embodiments of the present application when winding the electrode assemblies 40, and FIG. 12 is a schematic structural view of the winding needle assembly 100 according to some embodiments of the present application after completion of winding the electrode assemblies 40);

S120: clamp the two electrode assemblies 40; and

S130: respectively separate the first execution section 22 and the second execution section 23 from the support seat 10 along the axial direction X of the winding needle, and enable the first execution section 22 and the second execution section 23 to be separated from the corresponding electrode assemblies 40 in the separation process (referring to FIG. 13, FIG. 13 is a schematic structural view of the winding needle assembly 100 according to some embodiments of the present application when removing the electrode assemblies 40).

In step S110, the first execution section 22 and the second execution section 23 are rotated. That is, the corresponding positive electrode plate 41, negative electrode plate 42, and spacer 43 are respectively wound by the winding part 211 of the first execution section 22 and the winding part 211 of the second execution section 23, so as to complete winding processing of the corresponding electrode assembly 40.

In step S120, the electrode assembly 40 is clamped. That is, the completely wound electrode assembly 40 is fastened. The electrode assembly 40 may be clamped manually, or the electrode assembly 40 may be clamped by an automatic device, such as a manipulator, so as to facilitate subsequent extraction of the first execution section 22 and the second execution section 23 from the corresponding electrode assemblies 40, thereby completing the unloading of the electrode assembly 40.

In step S130, the first execution section 22 and the second execution section 23 are moved away from each other in the axial direction X of the winding needle, so that both the first execution section 22 and the second execution section 23 can be separated from the support seat 10 and extracted from the corresponding electrode assemblies 40. After the first execution section 22 and the second execution section 23 are extracted from the corresponding electrode assemblies 40, the unloading of the electrode assembly 40 can be achieved by transferring the electrode assembly 40. Then, the first execution section 22 and the second execution section 23 are moved close to each other in the axial direction X of the winding needle, so that both the first execution section 22 and the second execution section 23 can be connected to the support seat 10, thereby facilitating subsequent winding processing of a new electrode assembly 40.

Following the winding of two electrode assemblies 40 by the first execution section 22 and the second execution section 23 respectively, the two electrode assemblies 40 are clamped, so that in the process of respectively separating the first execution section 22 and the second execution section 23 from the support seat 10 along the axial direction X of the winding needle, the first execution section 22 and the second execution section 23 can be respectively taken out from the corresponding electrode assemblies 40. In this way, the winding needle 20 can be simultaneously taken out from the two electrode assemblies 40, thereby being conducive to reducing the difficulty in taking out the winding needle 20 from the two electrode assemblies 40, optimizing the production cycle of taking out the winding needle 20 from the two electrode assemblies 40, and being conducive to improving the production efficiency of the electrode assembly 40.

It should be noted that in the case of no conflict, the embodiments in the present application and the features in the embodiments may be combined with each other.

The above descriptions are merely preferred embodiments of the present application, and are not intended to limit the present application. For those skilled in the art, the present application may have various modifications and changes. Any modification, equivalent replacement, or improvement made without departing from the spirit and principle of the present application shall fall within the scope of protection of the present application.

What is claimed is:

1. A winding needle assembly, comprising:

a support seat; and a winding needle rotatably connected to the support seat around an axial direction of the winding needle, the winding needle extending out of the support seat along the axial direction of the winding needle, so as to form a plurality of winding parts located outside the support seat on the winding needle and the winding parts being configured to wind electrode assemblies, wherein the winding needle comprises at least two execution sections and a rotating member, the at least two execution sections are separately disposed and are rotatably connected to the support seat around the axial direction of the winding needle, each of the at least two execution sections has a winding part, the rotating member is rotatably connected to the support seat around the axial direction of the winding needle, each of the at least two execution sections is rotatably connected to the rotating member, each of the at least two execution sections comprises a connecting part and a driving part, the connecting part and the driving part are respectively connected to two ends of the winding part along the axial direction of the winding needle, the connecting part is detachably connected to the rotating member, and the driving part is configured to be connected to a driving mechanism.

2. The winding needle assembly according to claim 1, wherein the at least two execution sections comprise a first execution section and a second execution section, the first execution section and the second execution section are arranged along the axial direction of the winding needle.

3. The winding needle assembly according to claim 1, wherein the execution sections are detachably connected to the support seat.

4. The winding needle assembly according to claim 1, wherein the connecting part is in inserted fit with the rotating member along the axial direction of the winding needle.

5. The winding needle assembly according to claim 4, wherein the rotating member is provided with a slot, and the connecting part is rotatably inserted in the slot.

6. The winding needle assembly according to claim 5, wherein a protrusion projects from a bottom surface of the slot, an end of the connecting part away from the winding part in the axial direction of the winding needle is provided with a locating hole, and the protrusion is inserted in the locating hole.

7. The winding needle assembly according to claim 1, wherein a size of the connecting part is less than the size of the winding part along a radial direction of the winding needle.

8. The winding needle assembly according to claim 1, wherein the support seat is provided with a mounting hole, the mounting hole extends through the support seat along the axial direction of the winding needle, and the rotating member is rotatably disposed in the mounting hole.

9. The winding needle assembly according to claim 8, wherein an outer side of the rotating member is sleeved with a bearing, and the bearing is disposed between the rotating member and a hole wall of the mounting hole.

10. The winding needle assembly according to claim 1, wherein the execution section is of a solid structure.

11. A method for winding electrode assemblies, applicable to the winding needle assembly according to claim 1, the method for winding electrode assemblies comprising:

rotating the winding needle to enable the winding parts of the at least two execution sections to respectively wind the electrode assemblies.

12. The method for winding electrode assemblies according to claim 11, wherein the at least two execution sections comprise a first execution section and a second execution section that are separately disposed, the first execution section and the second execution section are arranged along the axial direction of the winding needle, both the first execution section and the second execution section are rotatably connected to the support seat around the axial direction of the winding needle, both the first execution section and the second execution section have the winding parts, and the first execution section and the second execution section are detachably connected to the support seat; and the rotating the winding needle comprises:

rotating the first execution section and the second execution section to enable the winding part of the first execution section and the winding part of the second execution section to respectively wind the two electrode assemblies corresponding to the first execution section and the second execution section;

clamping the two electrode assemblies; and respectively separating the first execution section and the second execution section from the support seat along the axial direction of the winding needle, and enabling the first execution section and the second execution section to be separated from the corresponding electrode assemblies in a separation process.

13. A winding apparatus, comprising:

a winding needle assembly and a driving mechanism, wherein the winding needle assembly comprises:

a support seat; and a winding needle rotatably connected to the support seat around an axial direction of the winding needle, the winding needle extending out of the support seat along the axial direction of the winding needle, so as to form a plurality of winding parts located outside the support seat on the winding needle and the winding parts being configured to wind electrode assemblies, wherein the winding needle comprises at least two execution sections and a rotating member, the at least two execution sections are separately disposed and are rotatably connected to the support seat around the axial direction of the winding needle, each of the at least two execution sections has a winding part, the rotating member is rotatably connected to the support seat around the axial direction of the winding needle, each of the at least two execution sections is rotatably connected to the rotating member, wherein each of the at least two execution sections comprises a connecting part and a driving part, the connecting part and the driving part are respectively connected to two ends of the winding part along the axial direction of the winding needle, the connecting part is detachably connected to the rotating member, and the driving part is configured to be connected to the driving mechanism; and wherein the driving mechanism is configured to drive the winding needle to rotate relative to the support seat around the axial direction of the winding needle, so that the winding part winds the electrode assemblies.

14. The winding apparatus according to claim 13, wherein the at least two execution sections comprise a first execution section and a second execution section that are separately disposed, the first execution section and the second execution section are arranged along the axial direction of the winding needle, the first execution section and the second execution section are rotatably connected to the support seat around the axial direction of the winding needle, and both the first execution section and the second execution section have the winding parts; and the driving mechanism comprises a first driving member and a second driving member, the first driving member is connected to the first execution section, the first driving member is configured to drive the first execution section to rotate relative to the support seat, the second driving member is connected to the second execution section, and the second driving member is configured to drive the second execution section to rotate relative to the support seat.

15. The winding apparatus according to claim 14, wherein the first execution section and the second execution section are both detachably connected to the support seat; and the winding apparatus further comprises a moving mechanism, the moving mechanism is connected to the first execution section and the second execution section, and the moving mechanism is configured to drive the first execution section and the second execution section to be close to or away from each other along the axial direction of the winding needle, so that the first execution section and the second execution section are connected to or separated from the support seat.

* * * * *